Patented Apr. 24, 1923.

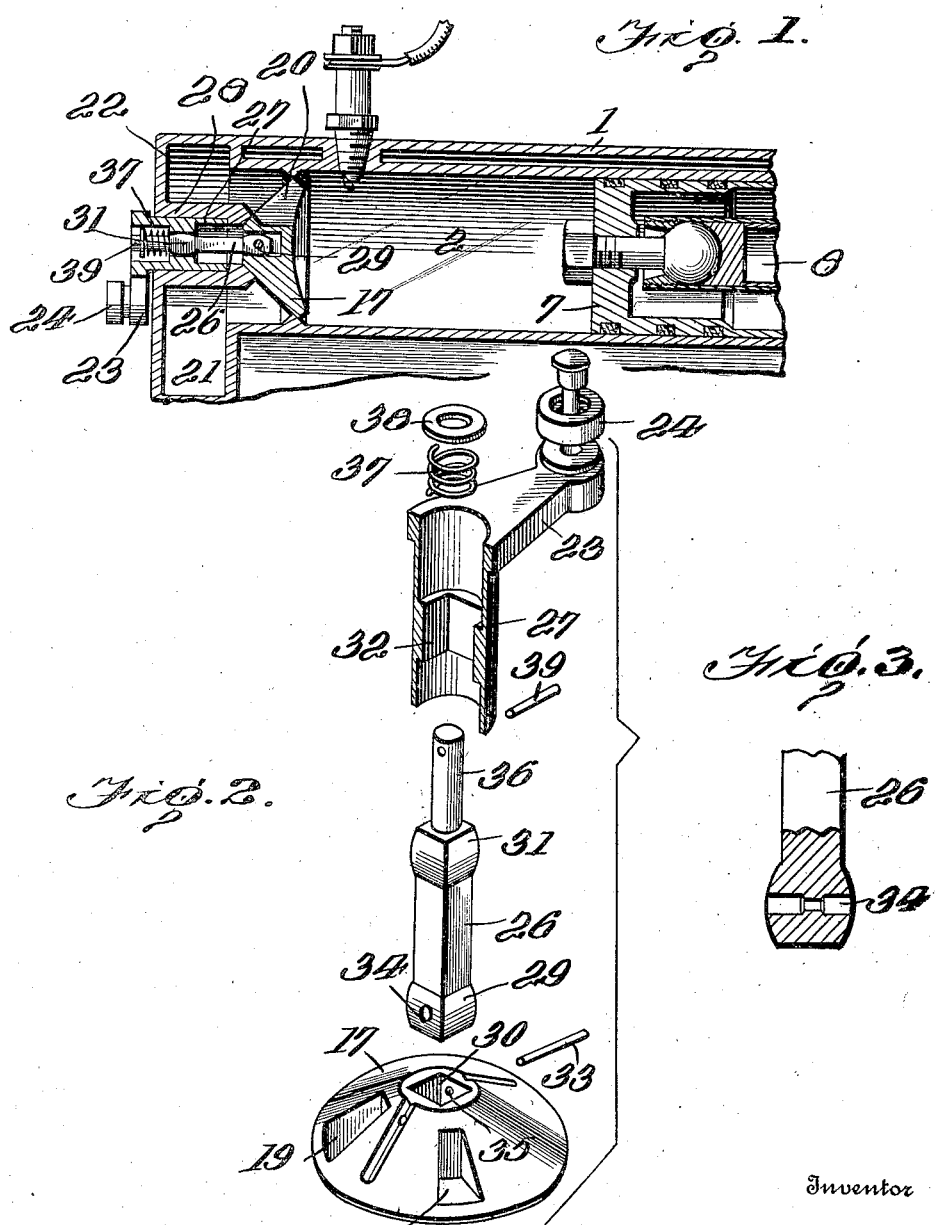

1,452,995

UNITED STATES PATENT OFFICE.

MELVIN A. YEAKLEY, OF CANTON, OHIO.

VALVE-OPERATING CONNECTION.

Original application filed May 17, 1915, Serial No. 28,669. Divided and this application filed December 30, 1919. Serial No. 348,455.

*To all whom it may concern:*

Be it known that I, MELVIN A. YEAKLEY, a citizen of the United States, residing at Canton, in the county of Stark and State of Ohio, have invented certain new and useful Improvements in Valve-Operating Connections, of which the following is a specification, reference being had therein to the accompanying drawing.

This invention relates to improvements in valve operating connections, and is a division of my application filed May 17th, 1915, Serial No. 28,669, for improvements in internal combustion engines.

The present improvement pertains particularly to a flexible operating connection for a conically shaped oscillating valve, whereby the accurate seating of the valve cannot be disturbed or altered in its operation, as would be the case with a rigid operating connection.

The flexible operating connection here referred to is in effect the valve stem, and it may be properly referred to as a flexible, or universally jointed valve stem for a conical oscillating valve.

My present improvement is particularly intended for use in connection with the wabbler type of a plurality cylinder engine, which is fully shown and described in my aforementioned pending application, though the invention is not limited to that particular form of engine.

In the accompanying drawings—

Fig. 1 is the longitudinal section view showing the valve and its operation mechanism.

Fig. 2 is an enlarged detached perspective view of the valve and its operating parts, shown in separated relation.

Fig. 3 is a sectional view of the inner end of the valve stem 26, showing its universal knuckle end.

My present improvement is here shown combined in a wabbler type of engine which is fully shown and described in my application hereinbefore mentioned and only sufficient reference will be made to the engine to enable the present improvement in valve operating connections or stems to be understood.

My present improvement pertains to the connections for operating the conical valves 17. These valves are located at the inner ends of the cylinders 2, and are seated against a conical seat 18 at the head of the cylinder. Attention is directed to the fact that the valve 17 and its seat 18 are of a frusto-conical shape, and that the valve seat forms the head of the cylinder.

The valve is provided with two radially arranged openings 19 and 20, one of which is an exhaust opening and the other an inlet opening, and these openings are adapted to operate in conjunction with the inlet and exhaust passages 21 and 22 of the engine housing.

In operation the valves are given oscillating movements on their seats 18, sufficiently to cause their exhaust and inlet openings 19 and 20 to alternately register with and close the exhaust and inlet passages 21 and 22. It will, of course, be understood that the valve seat 18 has corresponding inlet and exhaust openings with which the inlet and exhaust openings 19 and 20 of the valve operate.

These valves are caused to oscillate by means of crank arms 23, which have roller bearings 24. These crank arms 23 are operatively connected with the valve 17, through the medium of the valve stems 26.

As all of these valves and their connections are the same, it is only necessary to describe one of them.

The crank arm 23 carries an inwardly projecting socket 27 and this socket is journaled in a suitable housing or bearing 28 extending inward from the engine housing 1, and centrally located in respect to the cylinder 2 and the valve 17. The socket 27 is, therefore, oscillated in the housing 28 by the crank arm 23. The valve stem 27 has its inner end provided with an angularly-shaped head 29, which fits in an angular shaped socket 30 of the valve 17, so that it may have a rocking motion therein, and the stem is also provided with a similarly shaped head 31, which fits in a correspondingly angularly-shaped socket 32, formed within the socket 27 of the crank arm 23. The inner end 29 is suitably connected with the valve 17, by a pin 33 passing through openings 34 and 35, and the outer end of the stem projects, as shown at 36, and is surrounded by an expanding spiral spring 37, which has its inner end engaging the outer end of the annular socket 32, and a washer 38 is at the outer end of the spring and a pin 39 passes through the extension 36 outside of the washer 38. By means of this construction, the valve 17 is spring held to its seat and its stem 26 is universally connected with the valve stem and the crank arm 23, whereby it will have free movement to prevent it from being disturbed in its tight fit with the valve seat 18.

This construction provides a flexible or universal connection between the operating element or crank 23, and the valve, so that the seating of the valve is not affected or in any way controlled by the valve stem, as is the case with a valve having a rigid stem. It insures a tight seating of the valve at all times, and irrespective of the wear of the valve and its seat, and irrespective of the wear of the valve stem.

Having thus described my invention, what I claim and desire to secure by Letters Patent is—

1. The combination with an engine cylinder having a frusto-conical valve seat at its head, an oscillating frusto-conical valve on said seat, an oscillating operating member, and a valve stem having an oscillatory connection between the apex of the valve and the operating member, whereby the valve cannot be unseated by the oscillation of the valve stem.

2. The combination with an explosive engine cylinder having a conical valve seat at its head, said valve seat having a central opening receiving the apex of the valve, and an oscillating valve stem having an oscillatory connection with the apex of the valve, for the purpose described.

3. The combination with an explosive engine cylinder having a conical valve seat comprising a flange extending inward from the wall of the cylinder, and an inwardly extending centrally arranged housing, an oscillating frusto-conical valve having its apex seated on the inner end of the housing, and an oscillating valve stem extending through the housing and having an oscillatory connection with the apex of the valve and an oscillating operating member.

4. In a mechanism of the class described, a cavity valve seat having a valve stem aperture centrally thereof, a conical valve having a seating surface adapted to fit said valve seat and adapted to control pressure in both directions, a valve stem extending through said aperture having an oscillatory connection with said valve, a spring connecting said valve stem to hold the valve to its seat, whereby the valve is not tilted off its seat and is held seated while the pressure is opposite to the valve seating direction.

5. The combination with an engine cylinder having a conical valve seat at its head, a conical valve on said seat and having inlet and exhaust ports, an oscillating and operating socket concentric to the valve having an internal angular socket, and the valve having an outwardly extending angular socket, a valve stem having sockets fitting loosely the aforesaid sockets to permit relative oscillation, and a spring acting on the stem to hold the valve to its seat.

In testimony whereof I hereunto affix my signature.

MELVIN A. YEAKLEY.

Witnesses:
 M. M. WANAMAKER,
 A. B. CORRELL.